(12) United States Patent
Savilaakso

(10) Patent No.: US 7,024,181 B2
(45) Date of Patent: Apr. 4, 2006

(54) SYSTEM AND METHOD OF TRANSMITTING SERVICE CONTENT IN A MOBILE COMMUNICATION SYSTEM

(75) Inventor: Sami Savilaakso, Oulu (FI)

(73) Assignee: Nokia Mobile Phones, Ltd., Espoo (FI)

( * ) Notice: Subject to any disclaimer, the term of this patent is extended or adjusted under 35 U.S.C. 154(b) by 699 days.

(21) Appl. No.: 10/027,860

(22) Filed: Oct. 25, 2001

(65) Prior Publication Data

US 2002/0052198 A1 May 2, 2002

(30) Foreign Application Priority Data

Oct. 27, 2000 (FI) .................................. 20002370

(51) Int. Cl.
*H04M 11/10* (2006.01)

(52) U.S. Cl. ............................. 455/414.2; 455/414.1; 455/413; 455/412.1

(58) Field of Classification Search ............ 455/414.1, 455/414.2, 405, 406, 408, 466, 456.1, 456.3, 455/3.01, 422.1, 517, 566; 705/51–53
See application file for complete search history.

(56) References Cited

U.S. PATENT DOCUMENTS

| 5,572,442 A | * | 11/1996 | Schulhof et al. ............ 709/219 |
| 6,083,009 A | * | 7/2000 | Kim et al. ............... 434/307 A |
| 6,097,700 A | | 8/2000 | Thornberg et al. .......... 370/233 |
| 6,430,276 B1 | * | 8/2002 | Bouvier et al. ........ 379/121.01 |
| 6,560,456 B1 | * | 5/2003 | Lohtia et al. ............... 455/445 |
| 6,636,590 B1 | * | 10/2003 | Jacob et al. ........... 379/114.05 |
| 6,665,533 B1 | * | 12/2003 | Sakoda ..................... 455/414.2 |
| 2003/0216145 A1 | * | 11/2003 | Cox et al. ................. 455/456.1 |
| 2004/0092226 A1 | * | 5/2004 | Tsutsui et al. ............. 455/12.1 |

FOREIGN PATENT DOCUMENTS

| EP | 0788280 A3 | 8/1997 |
| EP | 0863641 A3 | 9/1998 |
| GB | 2337912 | 12/1999 |
| WO | WO 99/39466 | 8/1999 |
| WO | WO 00/01172 | 1/2000 |

OTHER PUBLICATIONS

"WAP—The Wireless Application Protocol", Erlandson et al., Ericsson Review No. 4, 1998.
Esp@cenet—Document Description of European Patent Application No. EP 0140593—8 page document.

* cited by examiner

*Primary Examiner*—Edward Urban
*Assistant Examiner*—Dai Phuong
(74) *Attorney, Agent, or Firm*—Perman & Green, LLP

(57) ABSTRACT

An arrangement for using a mobile communication service within a mobile communication system in which a mobile station is adapted to send a transmission request for an available service. The system receives the request and registers the request in a transmission queue. The system then reads the service content, when the transmission turn arises, from the transmission queue. The service content is then transmitted to all mobile stations located in the service area of the base station and logged in to receive service content.

27 Claims, 3 Drawing Sheets

| | 300 | 302 | 304 |
|---|---|---|---|
| | ↓ | ↓ | ↓ |
| | NO | PIECE | POINTS |
| | 01 | BBB | 35 |
| | 02 | FFF | 30 |
| | 03 | AAA | 25 |
| | | | |
| | 07 | TTT | 15 |
FIG. 3
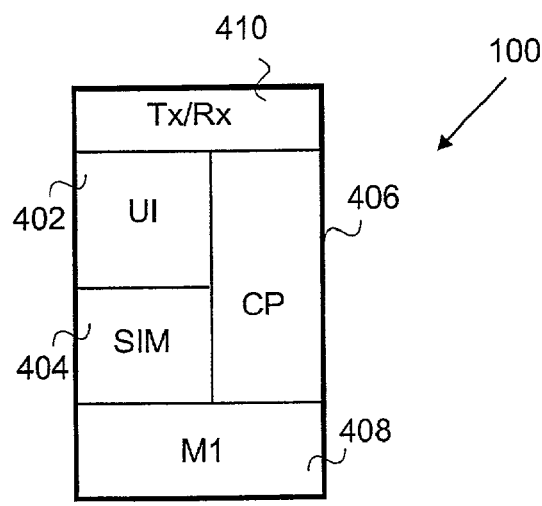
FIG. 4
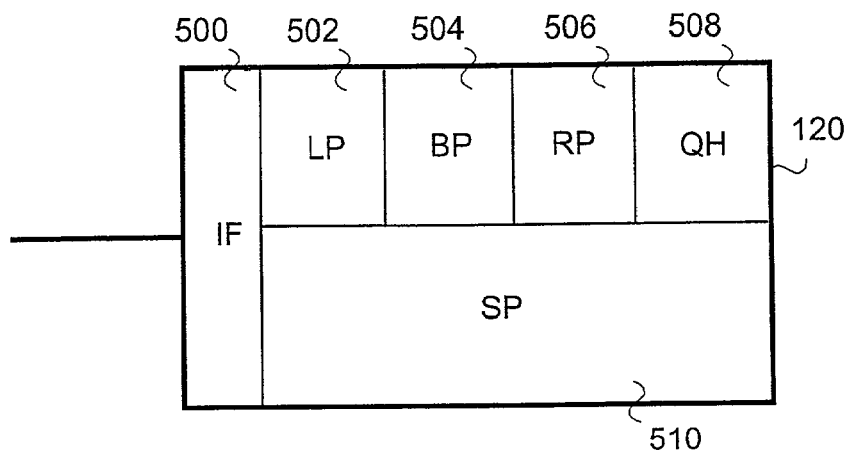
FIG. 5

SYSTEM AND METHOD OF TRANSMITTING SERVICE CONTENT IN A MOBILE COMMUNICATION SYSTEM

FIELD OF THE INVENTION

The field of the invention is mobile communication systems and particularly a solution for using a service in a mobile communication system.

BACKGROUND OF THE INVENTION

The development of mobile communication networks involves today to a great extent not only basic services relating to the transmission of conventional calls but also options allowing higher transmission speed and entertainment solutions. For example solutions of a service-on-demand type become possible as the data transmission capacity increases. As regards fixed telephone and cable networks, known solutions include for instance the one disclosed in EP 01400593 for ordering music videos to the user's home. In the solution disclosed, especially intended for transmitting short-term services, the subscriber selects a video from a large number of music videos, sends an order for the item and begins to receive transmission for example in 30 seconds' time from the order. In this solution, the orders by different users are sent to the users irrespective of each other, i.e. to each user separately. Video-on-demand solutions used for transmitting long-term services, such as video films, have been implemented in fixed data transmission networks also in such a way that when the user knows that a particular video film is transmitted for example at 14 and 18 o'clock, he/she can register to watch the transmission beginning at 18. Hence, the same content is sent to several users, thus reducing the costs the users have to bear. Further, from the point of view of the service provider, it is possible in the above solution to wait until there are for example ten subscribers to the film, to inform the user when the required number of subscribers is fulfilled, and subsequently to start the transmission.

The fixed network solutions according to the prior art, in which the service begins at a given time or once there are a given number of subscribers, are not optimal what it comes to the convenience of use.

BRIEF DESCRIPTION OF THE INVENTION

It is an object of the invention to implement an improved method for using a service in a mobile communication network. The invention relates to a method of using a service in a mobile communication network, in which method a service formed of one or more service contents are provided to be used by mobile stations connected to a mobile communication system. In the method, a transmission request for the desired service content is sent from a mobile station; the received transmission request is registered in the transmission queue maintained in the mobile communication system; the service content having the transmission turn is read from the transmission queue when the service is transmitted; and the service content is transmitted from the mobile communication system to all mobile stations logged in to receive service content.

The invention also relates to an arrangement for using a mobile communication service, comprising a mobile communication system, which comprises base stations for transmitting services formed of one or more service contents, the arrangement further comprising one or more mobile stations connected to the base station of the mobile communication system. At least one mobile station of the mobile stations connected to the base station comprises means for sending a transmission request for the desired service content, the arrangement further comprising means for maintaining the transmission queue of service contents, means for receiving the transmission request for the desired service content, means for registering the received transmission request in the transmission queue, means for reading the service content having the transmission turn from the transmission queue when the service is transmitted, and means for transmitting the service content to all mobile stations located in the service area of the base station and logged in to receive service content.

The invention also relates to a network element in a mobile communication system for offering a service to mobile stations connected to the mobile communication system. The network element comprises means for maintaining the transmission queue of service contents; means for receiving the transmission request for the desired service content sent by the mobile station connected to the base station; means for registering the received transmission request in the transmission queue; and means for reading the service content having the transmission turn from the transmission queue when the service is transmitted, the intention being to send said service content to all mobile stations located in the service area of the base station and logged in to receive service content.

The invention also relates to a mobile station comprising means for being connected to a mobile communication network providing a service formed of service contents on its service channel; means for logging into the service channel of the mobile communication system to receive a service; and means for receiving service content together with other mobile stations logged into the service channel.

In other words, the invention relates to a method and apparatus for using a service in a mobile communication network. A mobile communication network refers to a telecommunication network which can serve mobile stations moving by means of a network, such as mobile phones and portable computers containing radio communication properties. In the description of this invention, a service refers to a sound and/or image service. In other words, services according to the invention include music, sound video, news and weather services. In a preferred embodiment of the invention, the service used in the mobile communication network is music, which is formed of service contents, i.e. pieces of music. The invention is particularly suitable for services in which the service contents are short, lasting a few minutes at most, even though the invention is not confined to the duration of the service contents.

The mobile communication network is formed of at least partly overlapping cells, each of which refers to the service area of one base station in the mobile communication network. The invention offers a service to the terminal devices located in the cell coverage area. The size of the area that the service of the mobile communication network covers is not to be interpreted as restricting the invention, as the range of use of the service may even vary from one cell to an area covering the whole network. In the invention, the mobile station transmits a transmission request for the desired service content to the mobile communication network, the transmission request received in the mobile communication network being positioned in the transmission queue. When the service is transmitted, the service content having the transmission turn is read from the transmission queue and transmitted to those mobile stations that have been logged in to receive the service.

The invention is particularly related to an implementation method of a service, so that the references in the description of the invention to parts and operation of the mobile communication system are to be understood as referential only, not as restricting the invention. The mobile communication system in which the invention is implemented comprises an option for bidirectional communication between the network and the mobile station. The network comprises an uplink data channel, i.e. a control channel, for transmitting transmission requests from mobile stations to the network. Further, the network comprises a downlink data channel, i.e. a service channel, for transmitting a service from the network to the mobile stations. There may be several parallel control channels in the system, depending on the implementation of the system. In some of the embodiments of the invention, the mobile communication system according to the invention is a digital mobile communication system, such as the third generation mobile communication system UMTS (Universal Mobile Telephony System) or a packet-switched radio system GPRS (General Packet Radio System) based on the second generation mobile communication system GSM (Global System for Mobile Communication). In the above systems, the short message service, SMS, or the wireless access protocol, WAP, may be used as the control channel. In downlink transmission, it is preferable to use a channel intended for packet-switched transmission, for example in the case of the GPRS the PDTCH channel (Packet Data Traffic Channel), which is controlled at the system level by the PCCCH channel (Packet Common Control Channel).

In a preferred embodiment of the invention, the service request received from the mobile station is positioned last in the transmission queue in the mobile communication system. On the service channel, the service content first in the transmission queue is selected as the service content to be transmitted. What is called as the FIFO (First-In-First-Out) method is applied to the processing of the queue. In one embodiment of the invention, the sending of transmission requests is free of charge but the user pays a monthly fee, for example, for the possibility to use the service. In another preferred embodiment of the invention, the sending of a transmission request is subject to charge, whereby the billing can be implemented as prepayment or as subscriber-specific payment. Prepayment means in this context that the user charges a certain sum of money in his/her service account, for instance, from which sum the cost of the subscription is subtracted. Subscriber-specific billing means that in connection with the subscription, the mobile communication network adds the expenses caused by the subscription of the service to the subscriber's telephone bill. In one embodiment of the invention, the user can determine the sum which will be charged when the subscription is made. As a compensation the desired service content is rated higher in the transmission queue. Thus, the transmission queue does not operate fully according to the FIFO principle, but the service content with the biggest investment may in the transmission queue pass the service contents with small investments.

In a preferred embodiment of the invention, the mobile stations have the possibility to receive information on the situation in the transmission queue. The mobile communication network provides information for example on the number of service contents in the queue and the transmission order of the service contents in the queue. The mobile station receives the information on the situation in the queue using for example corresponding techniques as when performing the transmission request, i.e. for example by means of SMS and WAP techniques. Of course, the mobile communication network can also automatically inform the terminals in the operating area of the service on the situation in the queue, without the mobile station itself requesting for the information.

In a solution according to the invention, there is in the area of the mobile communication network at least from time to time a mobile station which is capable of sending a transmission request for service content. It is possible that all terminals moving in the area of the mobile communication network do not necessarily have readiness to perform transmission requests, but the mobile stations can still log in to receive a service on the service channel if the charging principles allow this. It is also possible that the transmission queue of the service content is empty, whereby the mobile stations logging into the channel do not receive any service, or they receive for example a temporary service subsidized by advertisements.

Significant advantages are achieved by means of the invention in using services in the mobile communication network. The solution according to the invention saves resources of the mobile communication network, as the same content can be transmitted to several users simultaneously utilizing the same network resource. In the way according to the invention, at least part of the users of the mobile communication network can have influence on the content of the service transmitted on the service channel. Users can also receive a service that is paid for by other users of the channel without a separate subscription-specific fee.

BRIEF DESCRIPTION OF THE DRAWINGS

The invention will now be described in greater detail in connection with preferred embodiments, with reference to the attached drawings, of which

FIG. 3 illustrates the structure of a transmission queue according to a preferred embodiment of the invention;

FIG. 4 illustrates a block diagram of the structure of a mobile station according to an embodiment of the invention;

FIG. 5 illustrates a block diagram of the structure of a service center according to an embodiment of the invention.

DESCRIPTION OF EMBODIMENTS

The present invention can be applied in connection with mobile communication systems comprising a radio channel which transmits service-containing communication that can be received by several mobile stations simultaneously. Simultaneous receipt can be implemented for example in a mobile communication system allowing packet-switched communication, whereby mobile communication systems according to the invention include for example the UMTS system and the GPRS system further developed from the GSM. In the following, the invention will be described with reference to the GPRS system, the references being, however, intended to be interpreted broadly and not as restricting the invention. What is essential to the invention is the solution for providing the service and for using it in a mobile communication network, not in which part of the network and in which way, in a technical sense, the function is implemented.

Figure 1:
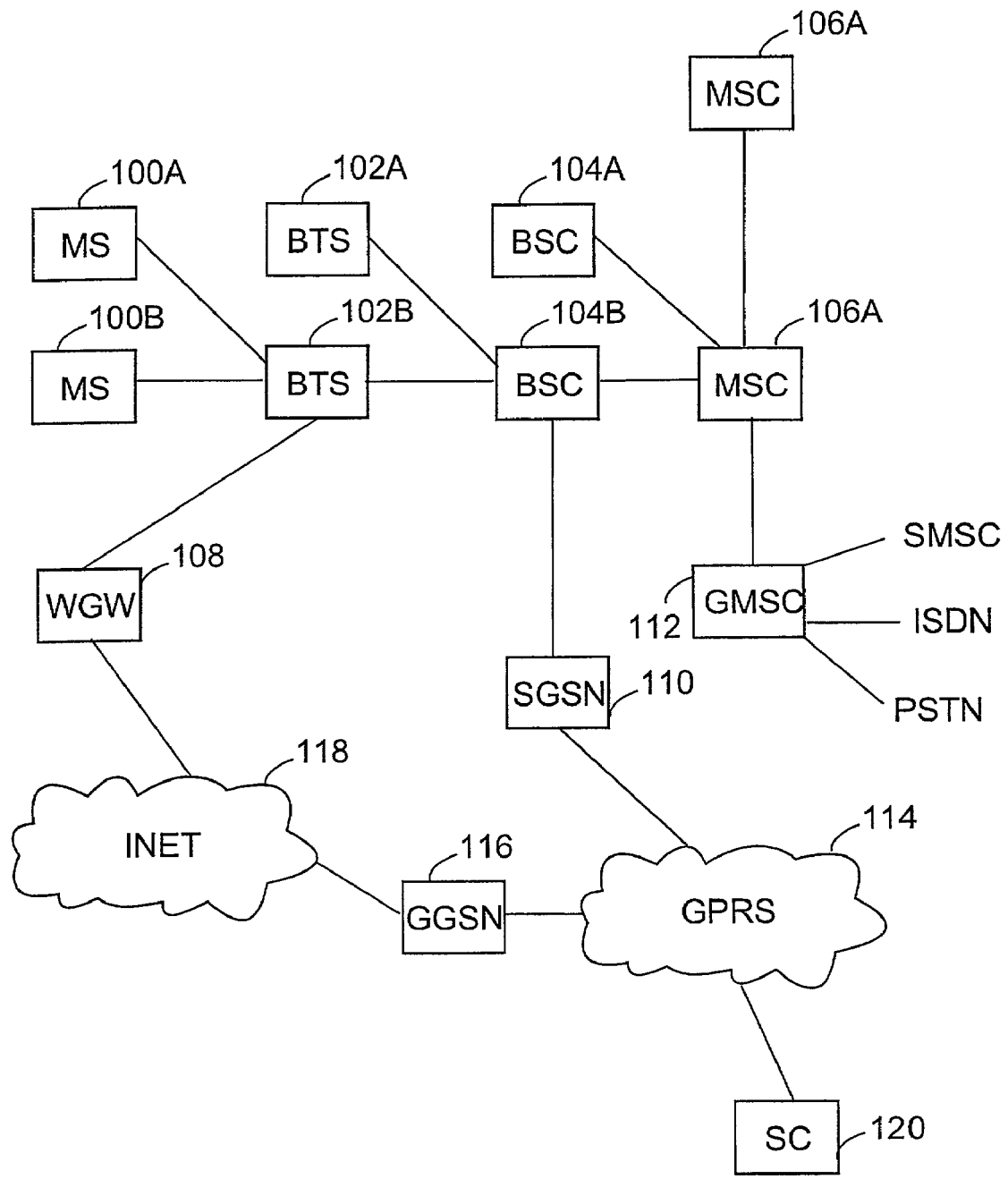
FIG. 1 illustrates a solution according to an embodiment of the invention for using a service in connection with a mobile communication network.

FIG. 1 illustrates a solution for implementing the service in the GPRS mobile communication network. Two of the base stations belonging to the network are shown, i.e. base stations 102A and 102B. The mobile stations 100A and 100B are in the service area of the base station 102B, i.e. in the coverage area of the cell formed by the base station. The operation of the base stations 102A, 102B of the base stations, such as control and use of radio channels, is controlled from base station controllers 104A, 104B, which are, in turn, under the mobile services switching center 106A. The mobile services switching center 106A performs among other things the routing of the call to be set up to the correct target by utilizing routing services provided by the GMSC to a fixed telephone network, PSTN, or a digital telephone network, ISDN. Through the GMSC, the GPRS network can also use the short message services provided by the short message service centre, SMSC. The short message services can, however, be implemented at least partly by means of a general short message service center, i.e. the cell broadcast centre, CBC, possibly connected to the base station controller. Further, the mobile services switching center is in the call set-up in connection with the home location register, HLR, of the mobile station subscriber and the visitor location register, VLR, of the network.

The GPRS trunk network 114 logically consists of two parts, an SGSN 110 (Serving GPRS Support Node), and a GGSN 116 (Gateway GPRS Support Node). By means of the SGSN 110 the GPRS trunk network 114 is connected to the base station system provided by the GSM network. The SGSN 110 attends to the registration of the mobile station in the GPRS network, transmits user information further and collects billing and statistical information on the use of the radio path. The GGSN 116, in turn, functions as the routing and gateway point for data packets between the external network, such as the IP (Internet Protocol) network or the X.25 network, and the GPRS network. The measures relating to the provision of the service of the present invention are implemented in a service center (SC) 120 in the mobile communication network, the operation of the service center being described in more detail in connection with FIGS. 2 and 5. Although the service center 120 is in FIG. 1 presented as being connected to the GPRS trunk network 114, it may also be implemented in connection with the SGSN, the GGSN or the Internet. It is also obvious that the functionality provided by the service center SC can be decentralized with the mobile communication network or to subnetworks connected to the network in a plurality of ways, but that the physical location of the functions in the network is not essential to the inventive idea. The network illustrated in FIG. 1 also comprises a possibility to use the Internet by means of a mobile station with WAP functions. Technically, the WAP implementation utilizes the WAP gateway 108 connected to the base station, which gateway converts the WML format used by the mobile station into the HTML format, and vice versa.

Figure 2:
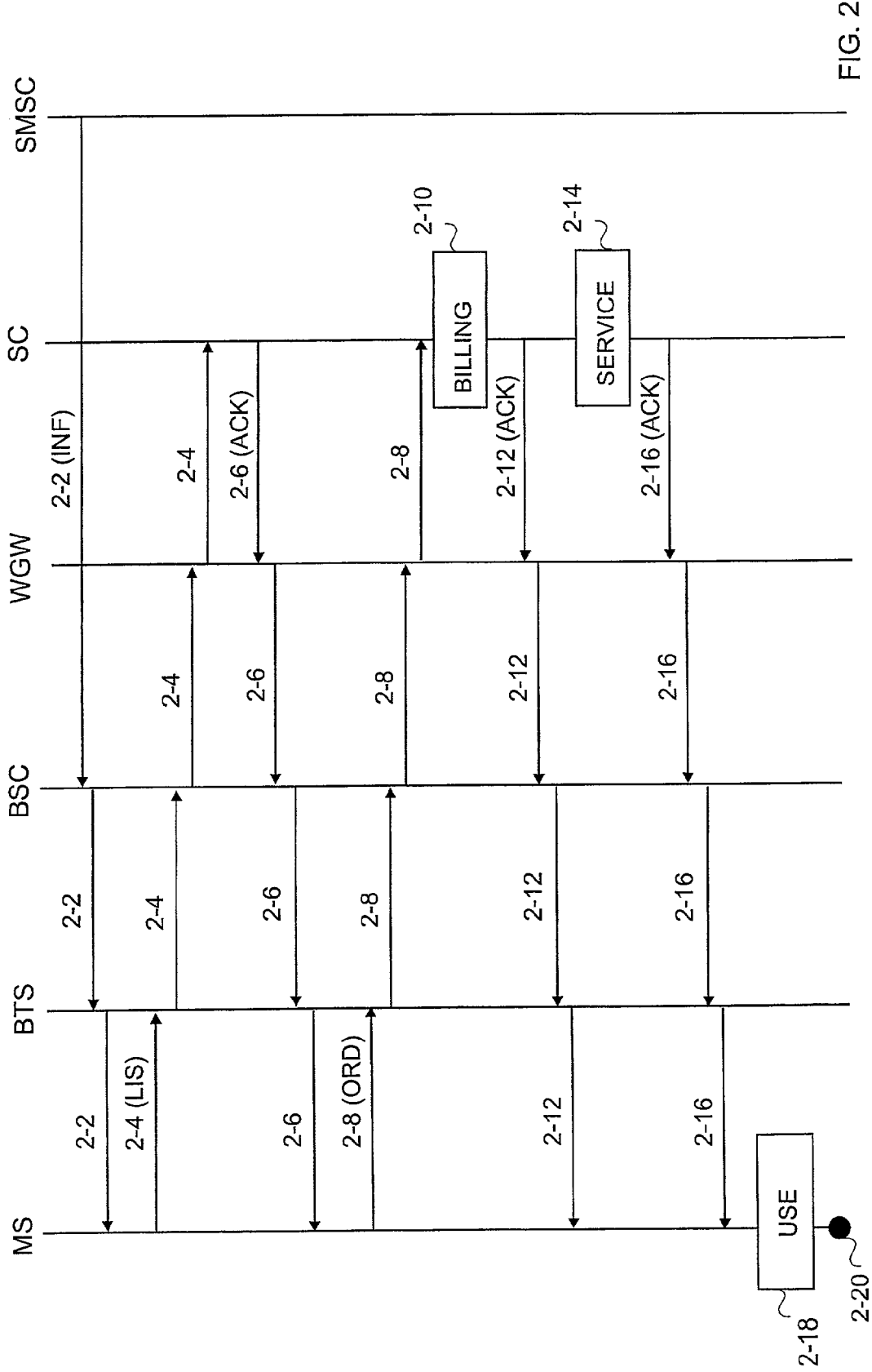
FIG. 2 illustrates an example of use of a method according to the invention.

FIG. 2 illustrates a method according to a preferred embodiment of the invention by means of an example of use of the service. It is obvious to a person skilled in the art that the steps described in the following are not strictly confined to the network elements presented but that they can be performed in several network elements and in a decentralized manner in the area of the mobile communication network. The mobile communication network provides the mobile stations in its area with different services in the form of sound and image. The service provided is for example factual information, such as news, weather or sports results information, or entertainment information, such as music or pieces of video. The service is transmitted on the traffic channel of the mobile communication network intended for sending radio communication, on which traffic channel one or more mobile stations can simultaneously receive the same service. Thus, for example, a given piece of music is simultaneously received on the service channel by all of the 50 mobile stations logged into the channel. In other words, the communication on the service channel is implemented in accordance with the narrowcasting concept, in other words there is no need to send a separate data stream according to the unicasting concept to each terminal in the service area of the cell in the mobile communication network if the terminals receive the same data content. Separate service channels can be arranged for different services, such as services containing different types of music. Alternatively, several services can be implemented on a single service channel in such a way that different types of services are divided to be sent on one service channel on different days and/or at different times of the day. In the narrowcasting solution, the mobile stations having the access right for the channel can log in to receive one single data stream, i.e. they can receive the same physical frequency and time interval intended for the transmission of the service. Narrowcasting differs from a transmission according to the broadcasting concept in such a way that in a narrowcasting transmission an access right is required for the data stream, unlike in broadcasting, in which the data content is sent to all mobile stations in the cell coverage area. Further, in accordance with an embodiment of the inventive idea, the service to be provided is a jukebox type service, meaning that the user can order the desired service content, which is positioned in the transmission queue in the network to be sent in its turn. The extent of the service can be determined by the operator and can be for example an area covering one town or the operator's global mobile communication network. In method step 2-2 in FIG. 2, the network sends information on the network services from the short message service center SMSC to the subscribers in the area of the network. The information is sent for example to all subscribers once a month, or alternatively, the information is sent to the subscribers that have registered in advance to use the service. The information can also be sent to the subscribers that are for the first time in a town or a corresponding area where the service is provided. The message 2-2 transmitted by the network can contain for example information on channel 1 sending jazz music and channel 2 sending pop music. The information sent at regular intervals can utilize for instance cell broadcasting technique, in which the short message is sent to all telephones in which the cell broadcast property is activated and which are in the service area at that moment. The information on the service offered to the terminals can also be sent using the WAP push technique, whereby direct links to the available services can be provided by means of the browser of the mobile station.

In method step 2-4, the user of the mobile station requests the network for more detailed information on the service provided. With reference to step 2-2, the user may request the network for the situation on the pop channel. The situation on the channel may be requested for example by means of a short message or a WAP connection, as presented in FIG. 2. In method step 2-6, the network replies to the user's request to list the situation on the channel. The information 2-6 sent to the mobile station contains for example the situation in the queue, i.e. how many pieces of music are waiting for their transmission turn on the service channel. In one embodiment, the mobile station is provided with information on how long, in total, it will take to play all pieces. Further, the information sent to the mobile station can be formed of the transmission order of the pieces and/or contain information relating to the use of the channel, such as fees or making orders. In step 2-8, the mobile station performs the order for the desired piece of music. In one embodiment in step 2-8, the mobile station only logs in to listen to the music on the channel without making orders of its own. The order can be made for example as a short message or by means of a WAP browser, as shown in FIG. 2. The order can be made for example in such a way that if in step 2-2 the mobile station has been provided with information on the services by means of the WAP push technique, the user can select the desired service from the display of the mobile station by means of the menu structure. After this, the mobile station and the mobile communication network perform connection set-up on the control channel, determining for example the radio frequency to which the mobile station has to go to to receive the service. If the user makes an order to listen to the service content in the step, the mobile station transmits information to the network in connection with the order on how much money the user wishes to use for making the order. The position of the service content in the transmission queue depends in this case on the sum the user has paid. The above interdependence will be described in greater detail in connection with the description of FIG. 3. Irrespective of whether they make orders of their own for the service transmitted on the channel, the users can be billed for the connection time. The billing for the connection time can be made for example in connection with the telephone bill, whereby the network measures the time between the connection to the channel and the disconnection from the channel. The network service center SC registers in step 2-10 the service content sent by the user in the transmission queue and performs the billing measures relating to the transmission request. The billing may be implemented by using known methods, for example by adding the cost to the user's telephone bill or by deducting the sum to be debited from the user's account, which has been credited beforehand. The network acknowledges receipt of the order in method step 2-12. In one embodiment, information is sent in connection with the acknowledgement 2-12 from the network to the mobile station on how the channel is received. The logging into the channel can be done in such a way, for example, that the user is transmitted in the acknowledgement 2-12 a telephone number to call and a user-specific password to log into the channel. It is obvious that there are also other ways to ensure the users' right to use the service. For example, the network can give the mobile station an encryption key, by means of which the service information received on the channel must be decrypted.

In method step 2-14, the service center reads from the transmission queue the service content having the transmission turn, such as a piece of music, which is sent on the service channel in step 2-16 to all mobile stations logged in to receive the service. The service content is preferably sent according to the streaming concept, whereby the intention is to send data from the network to the mobile stations in such a way that the receivers of the service can experience that they receive the service in real time. Thus, the mobile station preferably comprises a memory buffer, to which data packets can be buffered, when needed, and which buffer queue can be shortened at moments when there are deficiencies in the transmission capacity of the network. Method step 2-14 above specifically refers to the production of the user's service content, since the network preferably provides a service in a continues manner and also in such a manner, for example, that if there are no orders for pieces of music from the users, random pieces will be played as background music. In step 2-18, the mobile station receives the service sent on the channel, until it stops the use of the service in step 2-10. Although FIG. 2 does not show the transmission of the stopping information to the service center, it is obvious that if it is necessary to follow the usage time of the service for example because of billing, this information is sent to the network.

In a preferred embodiment of the invention, the service is financed by advertisements sent on the channel between the service contents, whereby using the actual service by means of a mobile station is free of charge. Thus, mobile station users can order service contents and/or log into the channel as shown in FIG. 2 without separate costs.

It is obvious that when the service is used, it is not necessary to perform all method steps shown in FIG. 2, but what is shown in FIG. 2 is only exemplary. The service can also be used in such a way, for example, that the performance of the method begins from step 2-8, i.e. from the order for the service content performed by the user.

FIG. 3 illustrates a potential structure for the transmission queue of service contents. The transmission queue table comprises an order indicator 300, service content 302 and points 304. In one embodiment, the table contains no points field 304 but the users' orders are placed last in the queue and the service content first in the queue is selected as the service content to be sent on the channel. The intention with the points field 304 is to emphasize the users' orders in different ways. In one embodiment, the points field directly contains the sum the users have invested on the piece altogether. It is to be noted that in step 2-8, the user does not necessarily order a piece which is not yet on the list but he/she can also vote for a piece ordered by another user. In FIG. 3, the piece FFF, which is second on the list, has for example collected its point from 30 different users, each of which has invested 10 monetary units to hear the piece. In one embodiment of the invention, the points are determined by both the amount of money invested and the time which the piece has spent in the transmission queue. Thus, the pieces having stayed long in the queue receive more points for the time in the queue and are not necessarily repeatedly passed by pieces on which more money is invested. Also, a maximum amount may be defined for the amount of money to be invested. If, for example, the maximum amount for the investment is 15 monetary units, the piece TTT has with the investment of 15 units risen as high in the table as is possible by means of an investment. Further, those who order the service often can be rewarded with bonus points, whereby the pieces ordered can be rated higher by giving them more points 304 according to FIG. 3, or whereby the user can be provided with the piece free of charge. Further, frequent repetition of certain service content can be implemented by maintaining a list of those service contents that have been provided last, i.e. a black list. Thus, repetition of the provided service content can be prevented for example for three hours although there would be sufficiently points for repeating the service content. Up-to-date black list information can be provided so that the users can see it in the same way as information on the number and/or order of the service contents in the queue.

FIG. 4 illustrates a mobile station 100 according to one embodiment. In GSM and GPRS systems, the mobile station 100 comprises an actual terminal and a user identification card SIM (Subscriber Identity Module) 404 connectable thereto. The mobile station 100 comprises a transmitter-receiver 410, which comprises means and functions to be in connection with the mobile communication network, i.e. to implement bidirectional radio communication between the mobile station and the mobile communication network serving the mobile station. The mobile station further comprises a user interface 402 comprising means for using the mobile station. The user interface 402 comprises for example a keyboard, a display, a loudspeaker and a microphone. In the solution according to the invention, the subscription to the service is performed with means for sending a transmission request for the desired service, which means are for example a combination of a keyboard and a transmitter-receiver 410. Hereby, a request is sent by means of the keyboard to form a subscription to the service content to be sent by means of the transmitter-receiver 410. The means for reading transmission queue information, such as the number of service contents, the total transmission time and the transmission order of the service contents are implemented for example in a way corresponding to the means for sending the transmission request for service content. The mobile station 100 further comprises means for logging into the service channel of the mobile communication system to receive service content. The means for logging into the channel are for example functions according to the GPRS protocol to initialize a data transmission on the channel suitable for packet transmission. The mobile station also comprises means for receiving a service on the service channel of the mobile communication system. The receiving means can be seen as a combination of the transmitter-receiver 410 and a media means, such as a loudspeaker and/or a display. By means of a loudspeaker, service content in the form of sound can be listened to, and correspondingly, visual information can be shown on the display of the mobile station.

The mobile station is further such that the circuit-switched and packet-switched connection can be used simultaneously. Hereby, the terminal allows a conventional call to be going on by means of a circuit-switched connection and a service to be simultaneously received along a packet-switched data channel. In one embodiment, the user may thus listen to the music on the service channel as background music while he/she is having a call. It is obvious that ways other than a keyboard can also be used to control the mobile station, such as for example menu control implemented on the display or speech control. The mobile station further comprises a central processing unit 406 for controlling the functions of the mobile station. For example software requirements for the user interface and the protocol-processing functions required for the communication to the network are implemented in the central processing unit 406. In one embodiment, the mobile station is capable of communicating not only by means of the GPRS protocol but also by means of the WAP protocol. The functions of the central processing unit 406 are preferably implemented as software for the microprocessor, but for example ASIC (Application Specific Integrated Circuit) or solutions consisting of logic components are also possible. The mobile station further comprises a memory 408 for storing the software used by the mobile station but also for fulfilling the memory requirement during the use, for instance for buffering data packets according to the streaming concept. It is obvious that the mobile station comprises lots of other functions and apparatus parts apart from the ones described above, but it is not relevant to describe them in this context.

In the following, the operation of the service center is described with reference to FIG. 5. Although the service center 120 is shown in the figure as a uniform network element, it is obvious that functions performed in the service center can be performed in many different places in the mobile communication network, such as in the parts SGSN and GGSN of the GPRS trunk network, in the Internet, or in parts of the mobile communication network, such as in the base station controller. The service center 120 of FIG. 5 comprises a connection unit 500, which implements for example the GPRS protocol, enabling the connection to the GPRS trunk network. The connection unit comprises among other things means to receive a service request for the desired service content and means for sending the service content to all mobile stations that are located in the service area of the base stations and have been logged in to receive service content. In practice, the connection unit 500 functions as the service transmitter towards the base station system, from which the service is actually sent to mobile stations via a radio path. The listing unit 502 of the service center 120 comprises for example means for presenting the number and/or the total transmission time of the service contents in the transmission queue and means for presenting the transmission order of the service contents to be read by the mobile stations. The means of the listing unit are implemented for instance with pages that can be read by means of the WAP protocol or with broadcast transmissions of short messages. A billing unit 504 enables functions for billing a mobile station. The functions are implemented with means for charging a mobile station for sending a transmission request for service content and means for charging the mobile station the sum according to the wishes of the mobile station user. The above means are implemented for example as software for the microprocessor. The billing unit 504 can also provide other ways to bill mobile stations, for instance on the basis of the connection time, as shown in FIG. 3. In a registration unit 506, measures are taken to confirm the user's right to use the service and, if needed, to give the user passwords and encryption keys for using the channel. A queue processing unit 508 comprises means for maintaining the transmission queue containing the transmission order of the service contents sent on the service channel and means for registering the transmission request in the transmission queue. The transmission queue is maintained among other things by means for positioning the received transmission request last in the transmission queue; means for reading as the service content having the transmission turn the service content that has the transmission turn, for example the service content first in the transmission queue; and means for observing that the position of the service content in the transmission queue depends on the sum paid by the user. The above means are implemented as software, for example, but can also be implemented in another known manner. The service unit 120 further comprises a service module for providing service content. Content is provided in known ways to produce analogue or digital sound and/or image information.

Although the invention has been described above with reference to the example according to the attached drawings, it is obvious that it is not restricted thereto but can be modified in a plurality of ways within the inventive idea defined in the attached claims.

The invention claimed is:

1. A method of using a service in a mobile communication network, in which one or more service contents are scheduled to be provided for use by mobile stations connected to a mobile communication system, comprising:

sending a transmission request for a desired service content from a mobile station;

registering the received transmission request in the transmission queue maintained in the mobile communication system;

reading the service content having the transmission turn from the transmission queue when the service is transmitted; and transmitting, from the mobile communication system, the service content having the transmission turn to all mobile stations logged into a traffic channel through which one or more mobile stations can simultaneously receive the same service content.

2. A method according to claim 1, wherein sending a transmission request for the desired service content from the mobile station on the control channel of the mobile communication system.

3. A method according to claim 1, wherein transmitting service content to the mobile stations logged in to receive service content on the service channel of the mobile communication system.

4. A method according to claim 1, wherein the service is music and the service content is a piece of music.

5. A method according to claim 1, wherein registering the received transmission request last in the transmission queue and reading the first service content in the transmission queue as the service content having the transmission turn.

6. A method according to claim 1, further comprising billing the mobile station for sending the transmission request for service content.

7. A method according to claim 6, wherein billing the mobile station for sending the transmission request for service content, the sum being according to the wishes of the mobile station user, whereby the position of the service content in the transmission queue depends on the sum paid by the user.

8. A method according to claim 1, wherein providing in the mobile communication system the number and/or the total transmission time of the service contents in the transmission queue to be read by the mobile stations.

9. A method according to claim 1, wherein providing in the mobile communication system the transmission order of the service contents in the transmission queue to be read by the mobile stations.

10. A method according to claim 1, wherein the mobile communication system is a GSM or UMTS digital mobile communication system, adapted for sending a transmission request for service content as a short message (SMS) or by means of a WAP protocol.

11. An arrangement for using a mobile communication service, comprising a mobile communication system, which comprises base stations for transmitting services formed of one or more service contents, the arrangement further comprising one or more mobile stations connected to the base station of the mobile communication system, wherein at least one mobile station of the mobile stations connected to the base station comprises means for sending a transmission request for the desired service content, the arrangement further comprising means for maintaining the transmission queue of service contents, means for receiving the transmission request for the desired service content, means for registering the received transmission request in the transmission queue, means for reading the service content having the transmission turn from the transmission queue when the service is transmitted, and means for transmitting the service content having the transmission turn to all mobile stations located in the service area of the base station and logged into a traffic channel through which one or more mobile stations can simultaneously receive the same service content.

12. An arrangement according to claim 11, the arrangement further comprising one or more control channels for sending transmission requests for service contents of mobile stations, and that sending means of the mobile station are arranged to send a transmission request for the desired service content on said control channel.

13. An arrangement according to claim 11, the mobile communication system further comprising a service channel for sending a service to the mobile stations logged in to receive a service.

14. An arrangement according to claim 11, wherein the service is music and that the service content is a piece of music.

15. An arrangement according to claim 11, the arrangement further comprising means for positioning the received transmission request last in the transmission queue and means for reading as the service content having the transmission turn the first service content in the transmission queue.

16. An arrangement according to claim 11, the arrangement further comprising means for billing the mobile station for sending the transmission request for service content.

17. An arrangement according to claim 16, wherein the billing means are arranged to charge the mobile station the amount of money the mobile station user wishes for sending the transmission request for service content, the arrangement comprising means for changing the position of the service content in the transmission queue depending on the sum paid by the user.

18. An arrangement according to claim 11, the arrangement further comprising means for presenting the number and/or the total transmission time of the service contents in the transmission queue to be read by the mobile stations.

19. An arrangement according to claim 11, the arrangement further comprising means for presenting the transmission order of the service contents in the transmission queue to be read by the mobile stations.

20. An arrangement according to claim 11, wherein the mobile communication system is a digital GSM or UMTS mobile communication system, and said transmission request for service content is sent in the system as a short message (SMS) or by means of a WAP protocol.

21. A network element in a mobile communication system for offering a service to mobile stations connected to the mobile communication system, wherein the network element comprises means for maintaining the transmission queue of service contents, means for receiving a transmission request for a desired service content sent by the mobile station connected to the base station, means for registering the received transmission request in the transmission queue, and means for reading the service content having the transmission turn from the transmission queue when the service is transmitted, the intention being to send said service content having the transmission turn to all mobile stations located in the service area of the base station and logged into a traffic channel through which one or more mobile stations can simultaneously receive the same service content.

22. A network element according to claim 21, wherein the service is music and the service content is a piece of music.

23. A network element according to claim 21, wherein the network element comprises means for positioning the received transmission request last in the transmission queue, and means for reading as the service content having the transmission turn the service content first in the transmission queue.

24. A network element according to claim 21, the network element further comprising means for billing the mobile station for sending the transmission request for service content.

25. A network element according to claim 24, wherein the billing means are arranged to charge the mobile station the amount of money the mobile station user wishes for sending the transmission request for service content, the network element comprising means for changing the position of the service content in the transmission queue depending on the sum paid by the user.

26. A network element according to claim 21, the network element further comprising means for presenting the number and/or the total transmission time of the service contents in the transmission queue to be read by the mobile stations.

27. A network element according to claim 21, the network element further comprising means for presenting the transmission order of the service contents in the transmission queue in the mobile communication system to be read by the mobile stations.

* * * * *